United States Patent Office 3,098,660
Patented July 23, 1963

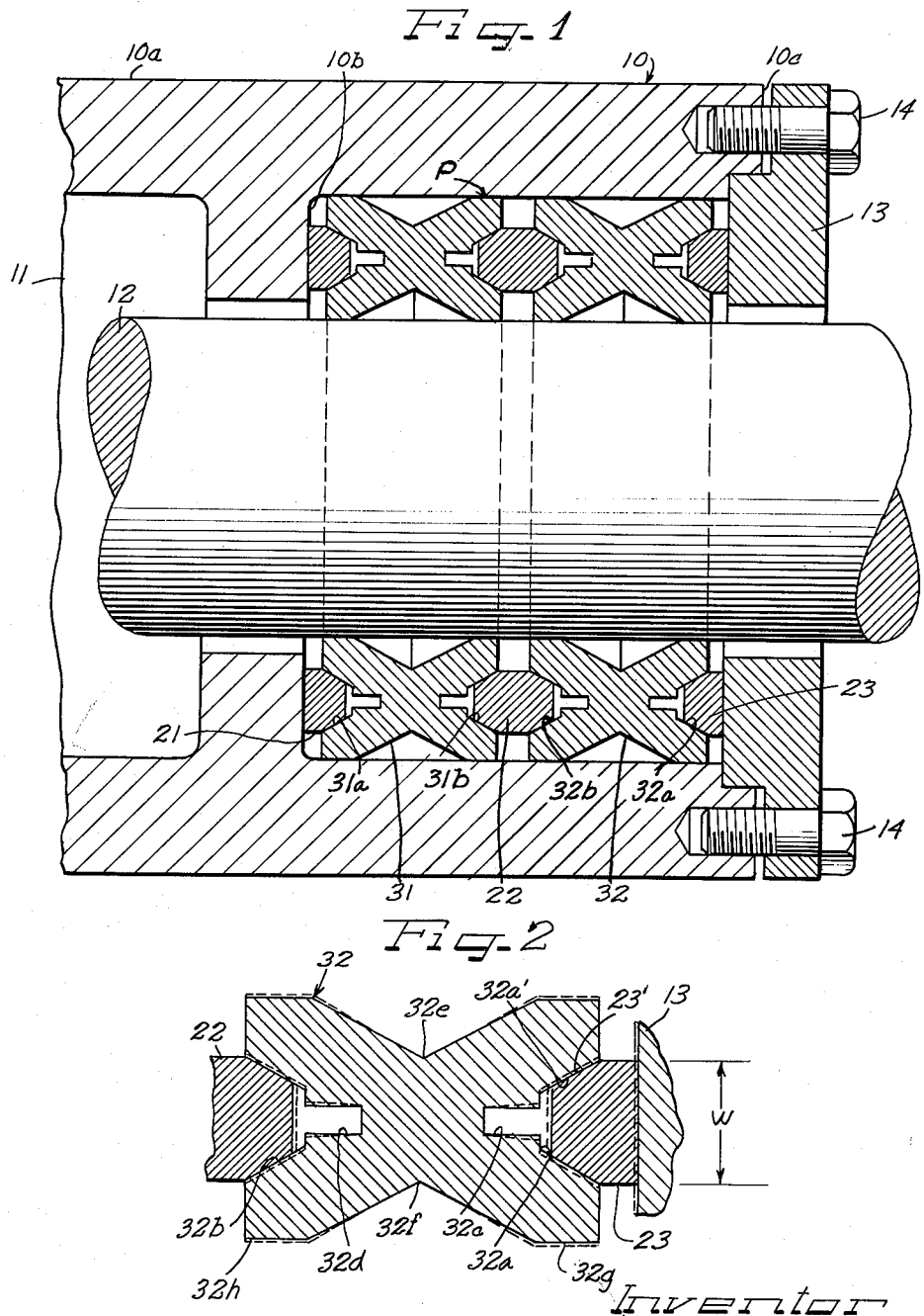

3,098,660
PACKING ASSEMBLY
Johann Karl Hausner, Chicago, Ill., assignor to Neotronic Corporation, Chicago, Ill., a corporation of Illinois
Filed Feb. 16, 1960, Ser. No. 8,985
2 Claims. (Cl. 277—187)

The instant arrangement relates to a packing assembly, and more particularly, to a packing assembly of durable character having a long working life and self-sealing and self-aligning characteristics during ordinary wear of the packing.

Although the usual fibrous packing material used in conventional pumps and the like is satisfactory for a number of purposes, this type of packing requires continuous attention, if only to repeatedly tighten up the gland so as to maintain the seal. This type of packing wears noticeably and permits leakage. In fact, the detection of leakage is usually used as a signal to indicate that the packing requires tightening or other attention. In contrast, the instant packing assembly is made of much more sturdy material and it is self-adjusting, in that it serves to adjust itself during wear, so that no leakage will occur.

The instant packing assembly is formed of a unique combination of elements which provide the self-adjustment, self-aligning and self-sealing properties desired to give substantially a "life time" packing assembly, which will last for the life of entire equipment in which it is used. The instant packing assembly may be used with a rod that merely rotates as in the shaft of a pump, or it may be used with a rod that reciprocates or moves axially, as in the case of an atomic reactor. In fact, the instant assembly is particularly useful as packing in an atomic reactor.

It is, therefore, an important object of the instant invention to provide an improved packing assembly.

It is a further object of the instant invention to provide an assembly for a packing housing surrounding a relatively movable rod, which comprises axially spaced wedge means surrounding the shaft in closely spaced relation thereto, and a cylindrical packing element interposed between said wedge means sealingly engaging said shaft, said packing element having a generally X-shaped cross-section with axially opposed grooves receiving said wedge means, said wedge means being adopted to be urged together so as to spread said grooves and urge the packing element into tighter sealing engagement with said shaft.

Other and further objects, features and advantages of the present invention will become apparent to those skilled in the art from the following detailed disclosure and the drawings attached hereto and made a part hereof.

In the drawings:

FIGURE 1 is a view of the instant packing assembly showing parts in section, parts in full view and parts broken away; and FIGURE 2 is an enlarged detail view of a packing element of the instant invention.

As shown on the drawings:

In FIGURE 1, there is shown a packing housing indicated generally by the reference numeral 10 which comprises a working housing portion 10a that connects to the operating part of the device 11 which may contain a liquid or other material that is to be sealed by the packing assembly indicated generally at P. A relatively movable shaft 12 is mounted within the housing 10 for relative movement. As here shown, the shaft is adapted for relative axial movement, but the instant assembly may also be used for the shaft which rotates. The housing 10 is provided with a packing shoulder 10b which tends to separate the working area 11 from the packing assembly P, although it does not form a seal with the shaft 12. A packing gland 13 mounted at the mouth 10c of the packing housing 10 and suitably affixed thereto by treated bolts 14, 14 closely surrounds the shaft 12, but also does not form a seal therewith. The packing gland 13 is afforded limited axial movement with respect to the shaft 12 by suitable adjustment by the bolts 14, 14 and in this way the packing gland 13 clamps the packing assembly P against the shoulder 10b of the packing housing 10.

Referring now to the details of the packing assembly P, it will be seen that this assembly P is composed of a plurality of axially spaced wedge means 21, 22, 23 surrounding the shaft 12 and in closely spaced relation thereto (but not forming sealing engagement therewith), and cylindrical or annular packing elements 31 and 32 interposed between the wedge means 21, 22, 23 and sealingly engaging the shaft 12. It will be seen that the packing elements 31 and 32 have a generally X-shaped cross-section with axially opposed grooves, 32a and 32b for the element 32 and 31a and 31b for the element 31. The groove 31a receives the wedge 21. The grooves 31b and 32b receive opposite tapered or wedge faces for the wedge 22; and the groove 32a receives the wedge 23. The tapered portion of the wedge 23 is slightly greater than the groove 32a in size, so that a wedge effect is obtained. The wedge effect is obtained when the packing gland 13 is clamped into operating position, as shown in FIGURE 1.

Referring now to FIGURE 2 for a specific example of the sizes, it will be seen that the gland 13 is shown fragmentarily and it urges the half wedge element 23 toward the left and into the groove 32a. The width $w$ of the wedge 23 in the embodiment here shown is 0.270 inch. Actually, the wedge 23 is a carbon steel member having a width $w'$ of 0.260 inch plus a chrome plate of 0.005 inch thickness, so as to give a total width $w$ of 0.270 inch. The chrome plate is particularly important in the practice of the instant invention, because it lubricates the wedge surface 23' so that a relative very slight movement between the wedge surface 23' and the groove surface 32a' may take place during the self-alignment which is unique with the instant device.

The packing element 32 is formed of a relatively yieldable compacted and sintered powdered metal material that is also self-lubricating. The groove 32a has an opening at its mouth of only 0.25 inch, so that the wedge 23 is slightly oversize and wedging effect is obtained when the packing assembly P is clamped together. Also, slots 32c and 32d are formed in the bottom of the grooves 32a and 32b, respectively, so that more easy spreading of the grooves 32a and 32b is accomplished by the wedging effect. It will also be noticed that the packing element 32 has top 32e and bottom 32f notches cut therein, also to facilitate the spreading of the grooves 32a and 32b when the wedges 22 and 23 are forced thereinto.

As shown in FIGURE 2, in light dotted lines, the tendency is for the wedges 22 and 23 to move toward each other slightly, so as to spread the grooves 32a and 32b.

In forming the packing element 32, the first step is to compact a bronze powder containing 3½% graphite and remainder bronze and sinter the same according to standard powder metallurgy procedures so as to obtain a porosity of 26–28%. The sintered article is machined to the shape X in cross-section of the instant element 32 and then placed in a chamber containing molten lead maintained at 300° C. A vacuum of 8 to 12 mm. Hg is drawn in the chamber and then the chamber is flooded with nitrogen or a suitable inert gas. In this way the powdered sintered article is impregnated with lead. It is then removed and the finishing touches to the shape are applied so as to obtain the shape shown in the drawings for the element 32. This element is self-lubricating. It wears only slightly, but if and when any wearing takes place, the effect of the wedges described in detail in connection with FIGURE 2 is to spread the grooves 32a and 32b slightly more and thus continuously apply sealing effect to the shaft at the surfaces 32g and 32h.

It will be understood that modifications and variations may be effected without departing from the spirit and scope of the novel concepts of the present invention.

I claim as my invention:

1. In a packing housing surrounding a relatively movable shaft, in combination at least three axially spaced wedge means having wedge faces terminating at a radial end face with the wedge faces defining therebetween an acute angle and the wedge being formed of chrome plated metal bodies surrounding the shaft in closely spaced relation thereto, and an annular packing element formed of a relatively yieldable porous metal impregnated with a solid metallic lubricant and interposed between each pair of said wedge means sealingly engaging said shaft, each said packing element having a generally X-shaped cross-section of small axial dimension with axially opposed grooves having generally flat bottoms smaller in radial dimension and spaced from said radial wedge faces, and having disposed at substantially said acute angle side walls for matingly receiving the wedge faces for receiving said wedge means, said groove bottoms having axially aligned slots, said packing elements having radially facing axially centered V-shaped notches, said notches, said slots and the spacing between the wedge radial faces and the groove bottom cooperating to facilitate easy spreading of the grooves, said wedge means being adapted to be urged together so as to spread said grooves and urge the packing element into tighter sealing engagement with said shaft.

2. A combination as claimed in claim 1 wherein there are three axially spaced wedge means with two annular packing elements positioned therebetween, and the axially outermost wedge means are provided with wedge faces and radial end faces only on the axially inward side of such wedge means, and the outermost sides of such outermost wedge means are provided with substantial generally radially aligned annular faces adapted to engage packing gland elements for applying axially aligned compressive forces to such outermost wedge means.

References Cited in the file of this patent

UNITED STATES PATENTS

| | | |
|---|---|---|
| 412,874 | Chaddack | Oct. 15, 1889 |
| 1,656,508 | Claus | Jan. 17, 1928 |
| 1,721,325 | Wilson | July 16, 1929 |
| 2,075,947 | Kennedy | Apr. 6, 1937 |
| 2,433,457 | Jerret et al. | Dec. 30, 1947 |
| 2,491,598 | Allen | Dec. 20, 1949 |
| 3,047,300 | Taylor et al. | July 31, 1962 |
| 3,047,301 | Taylor et al. | July 31, 1962 |

FOREIGN PATENTS

| | | |
|---|---|---|
| 130,711 | Germany | May 13, 1902 |